United States Patent [19]

Schlinger

[11] Patent Number: 4,491,456
[45] Date of Patent: Jan. 1, 1985

[54] PARTIAL OXIDATION PROCESS

[75] Inventor: Warren G. Schlinger, Pasadena, Calif.

[73] Assignee: Texaco Inc., White Plains, N.Y.

[21] Appl. No.: 562,259

[22] Filed: Dec. 16, 1983

Related U.S. Application Data

[62] Division of Ser. No. 393,264, Jun. 29, 1982, Pat. No. 4,443,228.

[51] Int. Cl.$^3$ ................................................ C10J 3/46
[52] U.S. Cl. ..................................... 48/197 R; 48/206; 48/209; 252/373
[58] Field of Search ............... 48/197 R, 206, DIG. 7, 48/86 R, 73, 61, 63, 189.1, 203, 209, 202; 252/373; 239/112, 132.3, 419, 422, 424, 427.3, 427.5, 423, 8, 13

[56] References Cited

U.S. PATENT DOCUMENTS

| | | | |
|---|---|---|---|
| 3,945,942 | 3/1976 | Marion et al. | 48/197 R |
| 4,113,445 | 9/1978 | Gettert et al. | 48/197 R |
| 4,351,647 | 9/1982 | Marion et al. | 48/197 R |
| 4,386,941 | 6/1983 | Crowl et al. | 48/197 R |

FOREIGN PATENT DOCUMENTS 543003  2/1932  Fed. Rep. of Germany ... 239/427.5

Primary Examiner—Peter Kratz
Attorney, Agent, or Firm—Robert A. Kulason; Albert Brent

[57] ABSTRACT

A high turndown de-slagging burner is provided for simultaneously introducing one or two mixed pairs of reactant feedstreams into a free-flow noncatalytic partial oxidation gas generator for the production of synthesis gas, fuel gas, or reducing gas by way of the central and/or annular sections of the burner, respectively. Each pair of feedstreams comprises a stream of free-oxygen containing gas with or without a temperature moderator and a pumpable liquid slurry stream of solid carbonaceous fuel, such as a coal-water slurry. Other hydrocarbonaceous fuels may be employed. The burner comprises four coaxial concentric conduits that are radially spaced to provide coaxial concentric annular passages. All of the conduits and annular passages are closed at the upstream ends and open at the downstream ends. Each pair of feedstreams is separately mixed together in a central or annular pre-mix chamber located upstream from the face of the burner. A water-cooled flat face-plate is provided with separate passages for discharging air or soot-blowing or de-slagging media at the face of the burner.

6 Claims, 2 Drawing Figures

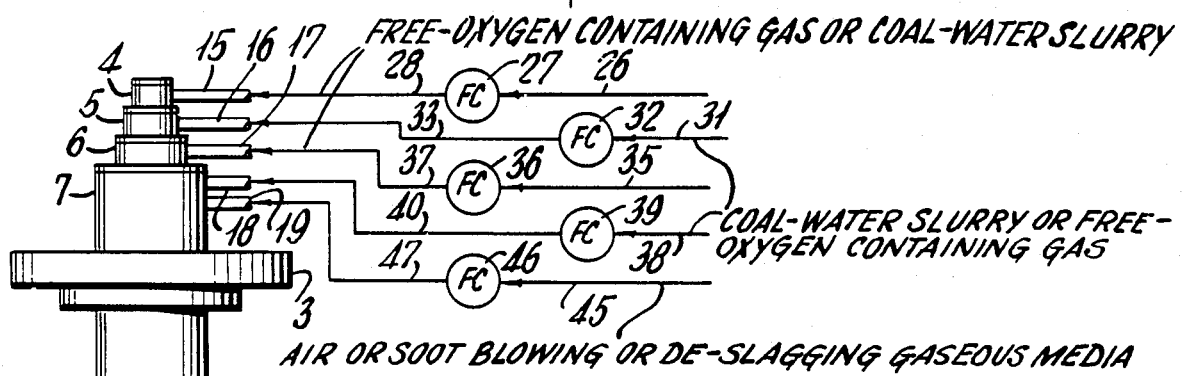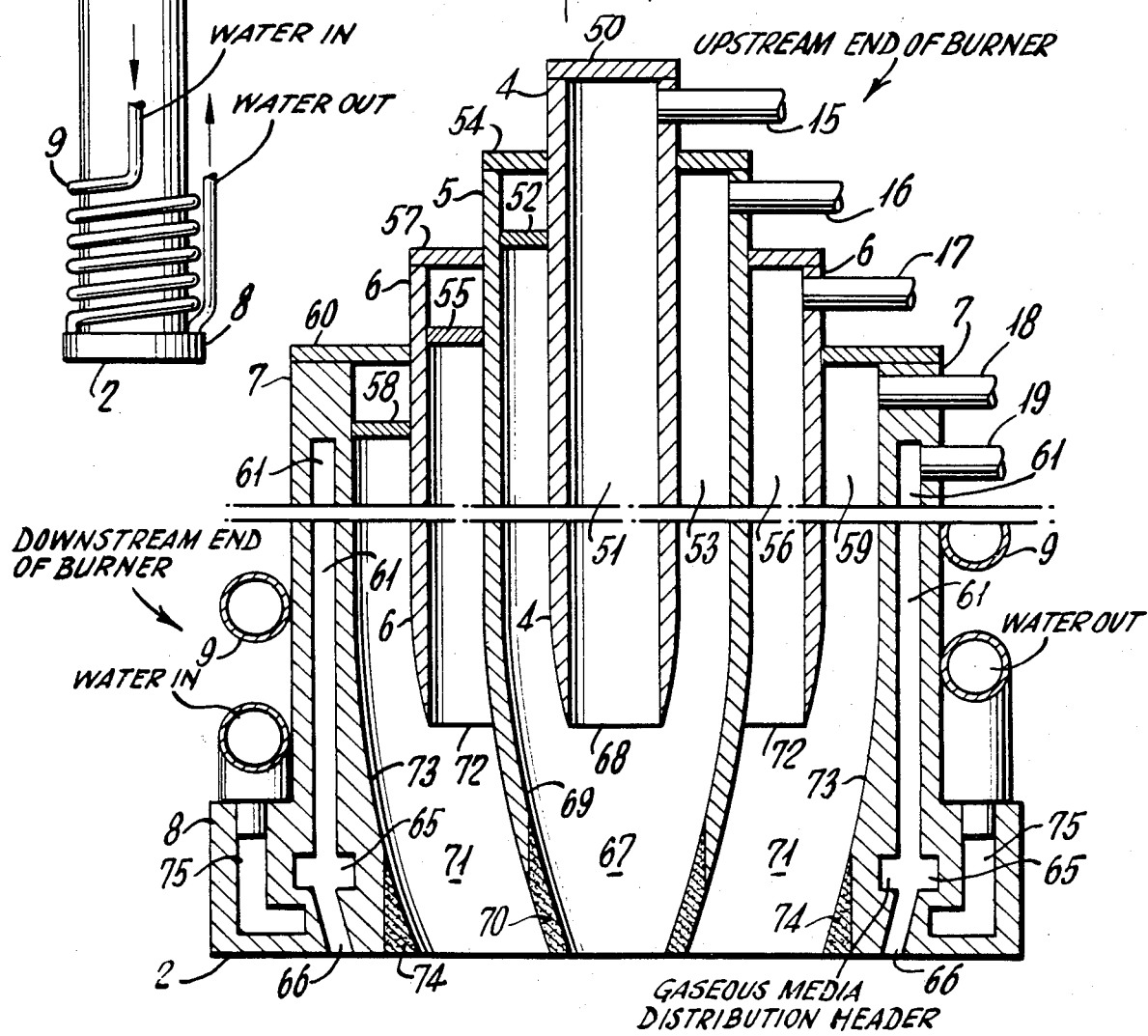

PARTIAL OXIDATION PROCESS

This is a division of application Ser. No. 393,264, filed June 29, 1982 now U.S. Pat. No. 4,443,228.

BACKGROUND OF THE INVENTION

1. Field of the Invention

This invention relates to the manufacture of gaseous mixtures comprising $H_2$ and CO, e.g., synthesis gas, fuel gas, and reducing gas by the partial oxidation of pumpable slurries of solid carbonaceous fuels in a liquid carrier or liquid or gaeous hydrocarbon fuel. In one of its more specific aspects, the present invention relates to an improved burner for such gas manufacture.

2. Description of the Prior Art

Annulus-type burners have been employed for introducing liquid hydrocarbonaceous fuels into a partial oxidation gas generator. For example, coassigned U.S. Pat. No. 3,528,930 shows a single annulus burner, and coassigned U.S. Pat. Nos. 3,758,037 and 3,847,564 show double annulus burners. However, in such burners, only one pair of reactant feedstreams are mixed downstream from the burner face, and missing are the high turndown, pre-mix, and soot-blowing or de-slagging features of the subject burner.

To obtain proper mixing, atomization, and stability of operation, a burner for the partial oxidation process is sized for a specific throughput. With prior-art burners, should the required output of product gas change substantially, shut-down of the system is required in order to replace the burner with one of proper size. This problem is avoided and costly shut-downs are avoided by the subject burner which will operate at varying levels of output while retaining efficiency, stability, and axial symmetry.

The more complex process for preheating a gas generator by means of a preheat burner, removing the preheat burner from the gasifier, and inserting a separate production burner is described in coassigned U.S. Pat. No. 4,113,445. In contrast, the subject burner may be used for both preheating and production without being removed from the gas generator.

SUMMARY OF THE INVENTION

An axially symmetric dual concentric high turndown de-slagging burner is provided for simultaneously introducing one or two mixed pairs of reactant feedstreams into a free-flow noncatalytic partial oxidation gas generator for the production of synthesis gas, fuel gas, or reducing gas. Each pair of reactant feedstreams comprises a carbonaceous or hydrocarbonaceous fuel stream, such as a pumpable liquid slurry of coal in water or a liquid or gaseous hydrocarbon fuel, and a stream of free-oxygen containing gas. A wide range of gasifier throughputs are obtained by simultaneously passing through the burner one or both of the mixed pairs of feedstreams. The burner includes separate central and annular sections so that each pair of feedstreams is kept separate as it passes through the burner.

The burner has pre-mix and high turn-down capabilities and includes four concentric cylindrical shaped conduits which are coaxial with the central longitudinal axis of the burner. The four coaxial concentric conduits are radially spaced to provide three coaxial concentric annular passages. All of the conduits and annular passages are closed at the upstream ends and open at the downstream ends. The four concentric coaxial conduits are each substantially cylindrically shaped with a downstream end that gradually develops into a converging long radius frusto-conical shaped nozzle at the downstream end of the burner. Central and annular pre-mix zones are provided by retracting the downstream tips of the central and third conduits upstream from the face of the burner. The downstream ends of the second and outer conduits terminate at the face of the burner. Alternate pairs of feedstreams of free-oxygen containing gas and carbonaceous fuel slurries or hydrocarbonaceous fuel are introduced respectively into the upstream ends of the four conduits. A pair of feedstreams is mixed together in the central or annular pre-mix chamber. Alternatively, simultaneously each of two pairs of feedstreams are separately mixed—one pair in each separate pre-mix chamber. A water-cooled flat face-plate is provided with separate passages for introducing air or sootblowing or de-slagging media at the face of the burner.

Advantageously by means of the subject burner, the velocity of the reaction component at the exit of the burner may be maintained at near optimum value over a much wider range of gasifier throughput. Throughput may be varied—up or down—over a wide range. Further, axial symmetry for the reactant flow pattern is achieved, and buildup of soot or slag on the face of the burner is prevented.

In one embodiment, the burner may be used as a combination pre-heat-production burner by passing fuel gas through the central passage and air through all of the other passages.

BRIEF DESCRIPTION OF THE DRAWING

In order to illustrate the invention in greater detail, reference is made to several embodiments involving burner constructions as shown in the figures of the drawing wherein FIG. 1 as a diagramatic vertical longitudinal schematic representation showing one embodiment or the burner;

FIG. 2 is a transverse longitudinal cross-section through the upstream and downstream ends of the burner shown in FIG. 1.

DESCRIPTION OF THE INVENTION

The present invention pertains to a novel burner for use in the non-catalytic partial oxidation process for the manufacture of synthesis gas, fuel gas, or reducing gas. The burner is preferably used with a reactant fuel stream comprising a pumpable slurry of solid carbonaceous fuel in a liquid carrier. Other suitable hydrocarbonaceous reactant fuel streams include liquid or gaseous hydrocarbon fuel, and mixtures thereof with or without admixture with a temperature moderator. Within the burner, a reactant feedstream of free-oxygen containing gas with or without admixture with a temperature moderator is mixed with the reactant fuel stream. The mixture of reactants is then discharged into the reaction zone of a conventional partial oxidation gas generator.

A hot raw gas stream is produced in the reaction zone of the noncatalytic, refractory-lined, free-flow partial oxidation gas generator at a temperature in the range of about 1700° to 3500° F. and a pressure in the range of about 1 to 300 atmospheres, such as about 5 to 250 atmospheres, say about 10 to 100 atmospheres. A typical partial oxidation gas generator is described in coassigned U.S. Pat. No. 2,809,104. The effluent raw gas stream from the gas generator comprises $H_2$, CO, $CO_2$ and at least one material selected from the group consisting of $H_2O$, $N_2$, A, $CH_4$, $H_2S$ and COS. Depending on the fuel and operating conditions, particulate carbon, fly-ash, or slag may be produced along with the raw gas stream.

During operation of the partial oxidation gas generator, it may be necessary to rapidly turndown the production of the effluent gas to less than the plant-design output, without replacing the burner. Changing the burner requires a costly shut-down period with resultant delay. Thus, in combined cycle operation for power generation a durable burner is required with offers minimum pressure drop and with which throughput levels may be rapidly changed—up and down—without sacrificing stable operation and efficiency. Further, the burner should operate with a variety of liquid, solid, and gaseous fuels, and mixtures thereof. These requirements have been fulfilled with the subject burner. Combustion instability and poor efficiency can be encountered when prior art burners are used for the gasification of liquid phase slurries of solid carbonaceous fuels. Further, feedstreams may be poorly mixed and solid fuel particles may pass through the gasifier without contacting significant amounts of oxygen. Unreacted oxygen in the reaction zone may then react with the product gas. Further, soot and slag build-up on the flat surfaces surrounding the discharge orifices at the face of the prior art burners would interfere with the velocity and flow pattern of the reaction components at the exit of the burner. These problems and others are avoided by the subject burner.

The velocity of the reactant stream through the central conduit and annular passages of the subject burner is in the range of about 1-50, say about 2-20 feet per second when said reactant stream is a liquid hydrocarbon fuel with or without admixture with a temperature moderator or liquid slurry of solid carbonaceous fuel, and in the range of about 100 feet per second to sonic velocity, say 150-500 feet per second when said reactant stream is a gaseous hydrocarbon fuel or a free-oxygen containing gas with or without admixture with a temperature moderator.

Alignment pins, fins, centering vanes, spacers and other conventional means are used to symmetrically space the conduits with respect to each other and to hold same in stable alignment without obstructing the free-flow of the feedstreams.

The downstream ends of the central and third coaxial concentric conduits are retracted upstream from the burner face to provide central and annular pre-mix chambers, respectively. Intimate mixing of the reactants takes place in the pre-mix chambers prior to discharge. There may also be some volatilization of the slurry medium without burning in the pre-mix chambers. For example, from about 0 to 100 volume %, such as 2 to 80 vol. %, of the liquid carrier may be volatilized without burning, the ratio of the volumes of the central/annular pre-mix chambers may be in the range of about 0.5 to 1.5, such as 1.0. The downstream ends of the second and outer conduits terminate at the face of the burner. The downstream ends of the central and third conduits are retracted upstream from the face of the burner a distance in the range of about 0.5 to 12 times, such as preferably greater than 2 to 10 times the minimum diameter of the central pre-mix chamber exit orifice at the face of the burner for better mixing. Preferably, the ends of the central and third conduits are retracted upstream from the face of the burner about the same distance.

Each of the four concentric coaxial conduits are substantially cylindrically shaped with a downstream end that gradually develops into a converging long radius frusto-conical shaped nozzle at the downstream end of the burner. The term "long radius" is well known and is the shape of an American Society of Mechanical Engineer's (A.S.M.E.) standard long-radius nozzle. A further description of the term may be found in "Thermodynamics Fluid Flow and Heat Transmission" by Huber O. Croft, page 155, First Edition, 1938 McGraw-Hill Book Company.

The length of the single central pre-mix chamber is determined by the distance that the tip of the central conduit is retracted upstream from the face of the burner. The inside walls of the central pre-mix chamber are bounded by a portion of the inside surfaces of the second conduit that gradually develops into a converging long radius frustoconical shaped nozzle. The length of the single annular pre-mix chamber is determined by the distance that the tip of the third conduit is retracted upstream from the face of the burner. The inside walls of the annular pre-mix chamber comprise a portion of the outside surface of the second conduit and a portion of the inside surface of the outer conduit that gradually develop into converging long radius frustoconical shaped nozzles at the downstream end of the burner.

The outlet portion at the face of the burner of said pre-mix chambers may be provided with frustoconical shaped inserts made from a thermal and wear resistant material, such as from tungsten carbide or silicon carbide.

In the operation of the burner, flow control means may be used to start, stop and regulate the flow of the four feedstreams to the passages in the burner. The feedstreams entering the burner and simultaneously and concurrently passing through at different velocities impinge and mix with each other the pre-mix chambers. The impingement of one reactant stream, such as the liquid slurry of solid carbonaceous fuel in a liquid medium optionally in admixture with a temperature moderator, with another reactant stream, such as a gaseous stream of free-oxygen containing gas optionally in admixture with a temperature moderator at a higher velocity, causes the liquid slurry to break up into a fine spray. A multiphase mixture is produced. As the mixture passes freely through the subject unobstructed burner its velocity changes. For example, at various points in the burner the velocity of the mixture may range from about 20 to 600 ft. per sec. As the mixture flows through the burner, the velocity changes are mainly the result of changes in the diameter of the flow path and the quantity and temperature of the mixture. This promotes a thorough mixing of the components. By operating in the region of turbulent flow, mixing may be maximized. Further, direct heat exchange between the materials takes place within the burner. From 0-100 vol. %, say about 5-80 vol. % of the liquids in the feedstreams may be vaporized without burning before the feedstreams leave the burner. By means of converging exit orifices, the feedstreams may be accelerated directly into the reaction zone of the partial oxidation gasifier.

Burning of the combustible materials while passing through the pre-mix chambers of the burner may be prevented by discharging the multiphase mixtures at the central and annular exit orifices at the tip of the burner with a discharge velocity which is greater than the flame propagation velocity. Flame speeds are a function of such factors as composition of the mixture, temperature and pressure. They may be calculated by conventional methods or determined experimentally. The ratio of the discharge velocity for the multiphase mixture being discharged through the central exit orifice to the multiphase mixture being discharged through the annular exit orifice may be in the range of about 0.5 to 1.5, such as 1.0. Depending on such factors as the temperature, velocity, dwell time and composition of the feedstreams; the desired amount of vaporization of liquid carrier; the temperature and amount of recycle gases in the generator; and the desired life of the burner; cooling coils may or may not encircle the outside barrel of the burner along its length.

The multiphase mixtures simultaneously departing from the central orifice and/or annular orifice at the downstream tip of the burner mix together downstream from the face of the burner. Advantageously, by means of the subject burner, the exothermic partial oxidation reactions take place a sufficient distance downstream from the burner face so as to protect the burner from thermal damage.

Pumpable slurries of solid carbonaceous fuels having a dry solids content in the range of about 30 to 75 wt. %, say about 40 to 70 wt. % and/or liquid hydrocarbon fuels may be passed through the inlet passages of the subject burner. The inlet temperature of the liquid hydrocarbon fuel or the slurry is in the range of about ambient to 500° F., but preferably below the vaporization temperature of the liquid hydrocarbon or the carrier for the solid carbonaceous fuel at the given inlet pressure in the range of about 1 to 300 atmospheres, such as 5 to 250 atmospheres, say about 10 to 100 atmospheres.

The term solid carbonaceous fuels, as used herein to described suitable solid carbonaceous feedstocks, is intended to include various materials and mixtures thereof from the group consisting of coal, coke from coal, char from coal, coal liquefaction residues, petroleum coke, particulate carbon soot, and solids derived from oil shale, tar sands, and pitch. All types of coal may be used including anthracite, bituminous, sub-bituminous, and lignite. The particulate carbon may be that which is obtained as a byproduct of the subject partial oxidation process, or that which is obtained by burning fossil fuels. The term solid carbonaceous fuel also includes by definition bits of garbage, dewatered sanitary sewage, and semi-solid organic materials such as asphalt, rubber and rubber-like materials including rubber automobile tires which may be ground or pulverized to the aforesaid particle size. Any suitable grinding system may be used to convert the solid carbonaceous fuels or mixtures thereof to the proper size.

The solid carbonaceous fuels are preferably ground to a particle size so that 100% of the material passes through an ASTM E 11-70 Sieve Designation Standard 1.4 mm (Alternative No. 14) and at least 80% passes through an ASTM E 11-70 Sieve Designation Standard 0.425 mm (Alternative No. 40). The moisture content of the solid carbonaceous fuel particles is in the range of about 0 to 40 wt. %, such as 2 to 20 wt. %.

The term free-oxygen containing gas, as used herein is intended to include air, oxygen-enriched air, i.e., greater than 21 mole % oxygen, and substantially pure oxygen, i.e., greater than 95 mole % oxygen, (the remainder comprising $H_2$ and rare gases).

Simultaneously with the fuel stream, a stream of free-oxygen containing gas is supplied to the reaction zone of the gas generator by way of a free passage in the burner at a temperature in the range of about ambient to 1500° F., and preferably in the range of about ambient to 300° F., for oxygen-enriched air, and about 500° to 1200° F., for air. The pressure is in the range of about 1 to 300 atmosphere, such as 5 to 250 atmosphere, say 10 to 100 atmospheres. The atoms of free-oxygen plus atoms of organically combined oxygen in the solid carbonaceous fuel per atom of carbon in the solid carbonaceous fuel (O/C atomic ratio) may be in the range of 0.5 to 1.95. With free-oxygen containing gas in the reaction zone the broad range of said O/C atomic ratio may be about 0.5 to 1.7, such as about 0.7 to 1.4. More specifically, with air feed to the reaction zone, said O/C atomic ratio may be about 0.7 to 1.6, such as about 0.9 to 1.4.

The term temperature moderator as employed herein includes water, steam, $CO_2$, $N_2$, and a recycle portion of the product gas stream. The temperature moderator may by in admixture with the fuel stream and/or the oxidant stream.

For example in one embodiment, the feedstream comprises a slurry of liquid hydrocarbonaceous material and solid carbonaceous fuel. $H_2O$ in liquid phase may be mixed with the liquid hydrocarbonaceous carrier, for example as an emulsion. A portion of the $H_2O$ i.e., about 0 to 25 weight % of the total amount of $H_2O$ present may be introduced as steam in admixture with the free-oxygen containing gas. The weight ratio of $H_2O$/fuel may be in the range of about 0 to 5, say about 0.1 to 3.

The term liquid carrier, as used herein as the suspending medium to produce pumpable slurries of solid carbonaceous fuels is intended to include various materials from the group consisting of water, liquid hydrocarbonaceous materials, and mixtures thereof. However, water is the preferred carrier for the particles of solid carbonaceous fuel. In one embodiment, the liquid carrier is liquid carbon dioxide. In such case, the liquid slurry may comprise 40–70 wt. % of solid carbonaceous fuel and the remainder is liquid $CO_2$. The $CO_2$-solid fuel slurry may be introduced into the burner at a temperature in the range of about −67° F. to 100° F. depending on the pressure.

The term liquid hydrocarbonaceous material as used herein to describe suitable liquid carriers is intended to include various materials, such as liquified petroleum gas, petroleum distillates and residues, gasoline, naphtha, kerosine, crude petroleum, asphalt, gas oil, residual oil, tar sand oil and shale oil, coal derived oil, aromatic hydrocarbon (such as benzene, toluene, xylene fractions), coal tar, cycle gas oil from fluid-catalytic-cracking operation, furfural extract of coker gas oil, methanol, ethanol and other alcohols and by-product oxygen containing liquid hydrocarbons from oxo or oxyl synthesis, and mixtures thereof.

The term sootblowing or de-slagging gaseous media as employed herein includes steam, $N_2$, $CO_2$, recycled product gas, and mixtures thereof.

The subject burners as shown in FIGS. 1 and 2 may be operated with the feedstreams passing through alternate passages in the burner. Typical modes of operation are summarized in Tables I and II below.

Table I lists the materials being introduced into the gasifier by way of the burner and their corresponding symbol. The solid carbonaceous fuel (B), water (C), and liquid hydrocarbonaceous material (E) may be mixed together in various combinations upstream from the burner inlet to produce a pumpable slurry which may be introduced into the burner and then passed through one the several free-flow passsages of the burner as shown in Table II. For example, the first entry in Table II shows that a pumpable slurry stream comprising solid carbonaceous fuel (B) in admixture with water (C) may be passed through the first annular passage and/or the third annular passage in the burner, i.e. FIGS. 1 and 2. In ordinary operation, whenever a fuel stream is introduced into a passage in one section of the burner, a corresponding stream of free-oxygen containing gas optionally in admixture with steam is simultaneously passed through the free passage in the same section of the burner.

TABLE I

| Material | Symbol |
|---|---|
| Free-oxygen Containing Gas | A |
| Solid Carbonaceous Fuel | B |
| Water or Carbon Dioxide | C |
| Steam | D |
| Liquid Hydrocarbonaceous Material | E |
| Temperature Moderating Gas | F |
| Gaseous Hydrocarbon Fuel | G |

TABLE II

| Central Conduit | First Annular Passage | Second Annular Passage | Third Annular Passage |
|---|---|---|---|
| A | B + C | A | B + C |
| B + C | A | B + C | A |
| A + D | B + E | A + D | B + E |
| B + E | A + D | B + E | A + D |
| B + C | A | E | A |
| E | A | E | A |
| A | E | A | E |
| E | A | B + C | A |
| A | G | A | B + C |
| A | G | A + D | E |
| A | E + F | A | E + F |

Other modes of operation of the subject invention are possible in addition to those shown in Table II.

When one of the fuel streams is a liquid hydrocarbon or the liquid carrier for the slurry of solid carbonaceous fuel is a liquid hydrocarbonaceous material premature combustion within the burner may be avoided by one or more of the following:

(1) employing less retraction of the ends of the central and third conduits from the face of the burner.

(2) keeping the fuel below its autoignition temperature, (3) discharging the multiphase mixture at the central and annular exit orifices at the tip of the burner with discharge velocities that exceed the flame propagation velocity.

(4) including water in the solid fuel slurry, (5) mixing steam with the air, (6) using air or air enriched with oxygen i.e. up to about 40 vol. % $O_2$.

The subject burner assembly is inserted downward through a top inlet port of a compact unpacked free-flow noncatalytic refractory lined synthesis gas generator, for example as shown in coassigned U.S. Pat. No. 3,544,291. The burner extends along the central longitudinal axis of the gas generator with the downstream end discharging directly into the reaction zone. The relative proportions of the reactant feedstreams and optionally temperature moderator that are introduced into the gas generator are carefully regulated to convert a substantial portion of the carbon in the fuel e.g., up to about 90% or more by weight, to carbon oxides; and to maintain an autogenous reaction zone temperature in the range of about 1700° to 3500° F., preferably in the range of 2000° to 2800° F.

The dwell time in the reaction zone is in the range of about 1 to 10 seconds, and preferably in the range of about 2 to 8. With substantially pure oxygen feed to the gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S+COS$ nil to 5, $N_2$ nil to 5, and A nil to 1.5. With air feed to the gas generator, the composition of the generator effluent gas in mole % dry basis may be about as follows: $H_2$ 2 to 30, CO 5 to 35, $CO_2$ 5 to 25, $CH_4$ nil to 2, $H_2S+COS$ nil to 3, $N_2$ 45 to 80, and A 0.5 to 1.5. Uncoverted carbon and ash are contained in the effluent gas stream.

Advantageously, in another embodiment of the subject invention the subject burner may be used as the preheat burner during start-up of the gasifier, as well as for the production burner. Start-up procedures are thereby simplified. Previously, time was lost when the gas preheat burner was replaced by the production burner, and the gasifier cooled down. Now the gasifier may be brought up to operating temperature and held there by simultaneously passing fuel gas through the central conduit and air through all of the other passages in the burner for feedstreams including the passages leading from the gaseous media distribution header located in the face-plate.

The fuel gas and air are mixed together to produce a well-distributed blend. Burning of the mixture by substantially complete combustion then takes place in the reaction zone of the gas generator at an absolute pressure in the range of about 0.56 to 300 atmospheres, and preferably at 1 atmosphere. The products of the complete combustion are removed from reaction zone. For example, they may be vented to the atmosphere. By this means, the reaction zone is heated to the temperature required for ignition of the autothermal partial oxidation reaction of the principal fuel selected from the group consisting of a pumpable slurry of solid carbonaceous fuel, liquid or gaseous hydrocarbon fuel, and mixtures thereof with a free-oxygen containing gas and with or without a temperature moderator. For example, the autoignition temperature may be in the range of about 2000° to 2700° F. At this point, the fuel gas and air are cut off, and the principal fuel and free-oxygen containing gas, with or without admixture with a temperature moderator are passed through the respective passages in the central and/or annular sections of the burner.

The stream of principal fuel and free-oxygen containing gas are mixed together to produce a well-distributed blend. The mixture ignites by autoignition and burns by partial oxidation downstream in the reaction zone of the free-flow noncatalytic gas generator.

DESCRIPTION OF THE DRAWING

A more complete understanding of the invention may be had by reference to the accompanying schematic drawing which show the subject invention in detail. Although the drawing illustrate preferred embodiments of the invention, it is not intended to limit the subject invention to the particular apparatus or materials described. Corresponding parts in the several figures have the same reference numbers.

Referring to FIG. 1, a high turndown, de-slagging burner assembly is depicted. Burner 1 is installed with downstream face 2 passing downwardly through a port in the top of a free-flow partial oxdiation synthesis gas generator. The longitudinal central axis of burner 1 is preferably aligned along the central axis of the synthesis gas generator by means of mounting flange 3. Burner 1 comprises central, second, third and outer concentric cylindrically shaped conduits 4, 5, 6 and 7 respectively. An annular coaxial water-cooled face plate 8 is located at the downstream end of the burner. External cooling coils 9 may encircle the downstream end of burner 1. Inlet pipes 15–18 for the reactant feedstreams are connected to central conduit 4, and concentric cylindrical conduits 5 to 7, respectively. Inlet pipe 19 for air or soot blowing or de-slagging gaseous media is connected to outer conduit 17.

Burner 1 comprises two principal sections, i.e. central and annular sections. The burner may be used with either one or both sections operating simultaneously. Thus, a pair of reactant feedstreams may be introduced into either one or both sections.

The central section of the burner comprises central conduit 4, second cylindrical coaxial conduit 5, and the annular passage therebetween. The annular section of the burner comprises the third cylindrical coaxial conduit 6, the outer cylindrical coaxial conduit 7, and two annular passages. A pair of reactant feedstreams may be introduced into the central section of the burner, for example, by passing the stream of free-oxygen containing gas in line 26 into central conduit 4 by way of line 26, flow control means 27, line 28, and inlet pipe 15. Simultaneously, a portion of the feedstream of coal-water slurry in line 31 may be passed into the second cylindrical conduit by way of line 31, flow control means 32, line 33 and inlet pipe 16. In a similar manner, a pair of reactant feedstreams may be introduced into the annular section of the burner, for example, by passing a portion of the free-oxygen containing gas in line 35 into the third cylindrical conduit by way of line 35, flow control means 36, line 37, and pipe 17. Simultaneously, a portion of the feedstream of coal-water slurry in line 38 may be passed into outer cylindrical conduit 7 by way of line 38, flow control means 39, line 40, and pipe 18.

In another embodiment, the feedstreams are interchanged so that coal-water slurry is in lines 26 and a portion of which may be introduced into central conduit 4 and/or third conduit 6. Simultaneously, the free-oxygen containing gas is in lines 31 and 38, and a portion of which may be introduced into second conduit 5 and/or outer conduit 7.

Advantageously, a gaseous material such as air or a soot blowing or de-slagging madia in line 45 is supplied to a passage extending longitudinally within the wall of outer conduit 7 (to be further described) by way of line 45, flow control means 46, line 47, and pipe 19.

Referring to FIG. 2, there is depicted a longitudinal cross-section of the upstream and downstream ends of the burner shown in FIG. 1.

With respect to the upstream end of burner 1, disc plate 50 is attached to, for example by welding, and closes off central conduit 4 at the upstream end. The feedstream in line 15 passes down unobstructed central passage 51. Central conduit 4 and second conduit 5 are spaced apart by a plurality of spacers 52 to provide concentric first annular passage 53. The feedstream in line 16 passes down unobstructed annular passage 53. Disc plate 54 is attached to and closes off the upstream end of second conduit 5 and annular passage 53. Central conduit 4 passes vertically through plate 54 and makes a gastight seal therewith. Second conduit 5 and third conduit 6 are spaced apart by a plurality of spacers 55 to provide a concentric second annular passage 56. The feedstream in line 17 passes down unobstructed annular passage 56. Disc plate 57 is attached to and closes off the upstream ends of third conduit 6 and annular passage 56. Second conduit 5 passes vertically through plate 57 and makes a gastight seal therewith. Third conduit 6 and outer conduit 7 are spaced apart by a plurality of spacers 58 to provide a concentric third annular passage 59. The feedstream in line 18 passes down unobstructed annular passage 59. Disc plate 60 is attached to and closes off the upstream end of outer conduit 7 and annular passage 59. Inlet pipe 19 is shown in communication with the upstream end of longitudinal passage means 61. Passage means 61 is shown in FIG. 2 as a concentric right cylindrical shaped annular passage that is coaxial with the central longitudinal axis of the burner. In another embodiment, said longitudinal passage means 61 may comprise a plurality of cylindrical shaped passages whose central longitudinal axes extend parallel to the central longitudinal axis of the burner. Such cylindrical shaped passages may be equally spaced in a concentric ring and pass longitudinally through the wall of outer conduit 7. Further, passage means 61 may be fed at its upstream end with air or other gaseous media from a plurality of inlet pipes 18 equally spaced around the circumference of the burner. The air or sootblowing or de-slagging gaseous media in line 19 passes down unobstructed passage 61.

With respect to the downstream end of burner 1, longitudinal passage 61 at its downstream end is in communication with concentric annular air or gaseous media distribution header 65 in annular flat face-plate 8. A plurality of right cylindrical shaped passage means 66 are in communication with distribution header 65 for passage of a plurality of high velocity jet streams of said gaseous media at the face of burner 1. The plurality of passage means 66 are equally spaced in a concentric ring and form a right cylindrical or frusto-concial shaped pattern with a converging angle with the central longitudinal axis of the burner in the range of about 0° to 45°, such as about 10° to 35°. Alternatively, passage means 66 may be a single concentric right cylindrical or frusto-conical shaped annular passage with a converging angle in the range of about 0° to 45°, and with or without distribution header 65.

Central pre-mix chamber 67 is a single chamber whose length is determined by the distance that tip 68 of central conduit 4 is retracted upstream from face 2 of burner 1. Central pre-mix chamber 67 is bounded on all sides by the inside wall of converging long radius frusto-conical shaped nozzle 69 of second conduit 5. Starting upstream from the face of the burner a distance of about 2.5 times the minimum diameter of the central pre-mix chamber exit orifice, in the embodiment shown conduits 4–7 may be substantially cylindrical. A frusto-conically shaped insert 70 of thermal and wear resistant material i.e., tungsten or silicon carbide is optionally inserted in the downstream tip of nozzle 69.

Annular pre-mix chamber 71 is a single chamber whose length is determined by the distance that tip 72 of the third conduit 6 is retracted upstream from face 2 of burner 1. Annular pre-mix chamber 71 comprises a coaxial generated converging long radius frustoconical shaped annular passage. Annular pre-mix chamber 71 is bounded on all sides by the outside wall of converging long radius frustoconical shaped nozzle 69 of second conduit 5 and the inside wall of converging long radius frustoconical shaped nozzle 73 of outer conduit 7. A frustoconically shaped insert 74 of thermal and wear resistant material i.e., tungsten or silicon carbide is optionally inserted in the downstream tip of nozzle 73.

Face plate 8 is provided with a concentric "L" shaped annular passage 75 for circulating cooling water. Cooling coils 9 are connected to the inlet and outlet of passage 75.

Although modifications and variations of the invention may be made without departing from the spirit and scope thereof, only such limitations should be imposed as are indicated in the appended claims.

I claim:

1. In a continuous process for the manufacture of gas mixtures comprising $H_2$, $CO$, $CO_2$ and at least one material from the group $H_2O$, $N_2$, A, $CH_4$, $H_2S$ and $COS$ by the partial oxidation of a feedstream comprising a pumpable slurry of solid carbonaceous fuel in a liquid carrier and a feedstream of free-oxygen containing gas optionally in admixture with a temperature moderator, said partial oxidation occuring in the reaction zone of a free-flow gas generator at an autogenous temperature in the range of about 1700° to 3500° F., and a pressure in the range of about 5 to 250 atmospheres, the improvement which comprises: (1) passing a first stream of a first reactant feedstream comprising a slurry of solid carbonaceous fuel in a liquid carrier in liquid phase at a temperature in the range of about ambient to 500° F., a pressure in the range of about 5 to 250 atmospheres, and a velocity in the range of about 1 to 50 ft. per second through either the central or first annular passage of a burner and into a central pre-mix chamber in said burner, wherein said burner comprises a central conduit having a central longitudinal axis that is coaxial with the central longitudinal axis of the burner, closing means attached to the upstream end of said central conduit for closing off same; an unobstructed exit nozzle at the downstream end of the central conduit which discharges through circular exit orifice located upstream from the face of the burner to provide a central pre-mix chamber that discharges through an unobstructed circular exit orifice at the face of the burner, inlet means connected to the upstream end of the central conduit for introducing a reactant feedstream; a second conduit coaxial and concentric with said central conduit along its length, an unobstructed exit nozzle at the downstream end of the second conduit which discharges through the circular orifice of said central pre-mix chamber at the face of the burner, spacing means between said central and second conduits for maintaining a spaced relationship and forming therebetween an unobstructed first annular passage with an unobstructed downstream annular exit orifice that discharges into the central pre-mix chamber, closing means attached to said second conduit and first annular passage at their upstream ends for closing off same, said central conduit passing through the upstream closed end of said second conduit and making a gastight seal therewith, and inlet means connected to the upstream end of the second conduit for introducing a reactant feedstream; a third conduit coaxial and concentric with said second conduit along its length, spacing means between said second and third conduits for maintaining a spaced relationship and forming therebetween an unobstructed second annular passage with an unobstructed downstream annular exit orifice located upstream from the face of the burner to provide a portion of an annular pre-mix chamber that discharges through an unobstructed annular exit orifice at the face of the burner, closing means attached to the second annular passage and third conduit at their upstream ends for closing off same, said second conduit passing through the upstream closed end of the third conduit and making a gastight seal therewith, and inlet means connected to the upstream end of the third conduit for introducing a reactant reactant feedstream; an outer conduit coaxial and concentric with said third conduit along its length, an unobstructed exit nozzle at the downstream end of the outer conduit which discharges through said annular exit orifice at the face of the burner, spacing means between said third and outer conduits for maintaining a spaced relationship and forming therebetween an unobstructed third annular passage with an unobstructed downstream annular exit orifice located upstream from the face of the burner that discharges into the remaining portion of said annular pre-mix chamber, closing means attached to the third annular passage and outer conduit at their upstream ends for closing off same, said third conduit passing through the upstream closed end of the outer conduit and making a gastight seal therewith, and inlet means connected to the upstream end of the outer conduit for introducing a reactant feedstream; an annular water-cooled flat face-plate encircling the downstream end of the burner, said face-plate being cored to provide an annular passage for circulating water and an annular header for distributing a gaseous material, passage means extending longitudinally in the wall of said outer conduit and in communication with said distribution header, inlet means in communication with the upstream end of said longitudinal passage means for introducing said gaseous material, and downstream passage means in communication with said distribution header for discharging said gaseous material at the face of the burner; (2) simultaneously and concurrently passing a second reactant feedstream comprising a free-oxygen containing gas optionally in admixture with steam through either the central conduit or the first annular passage whichever is free at a temperature in the range of about ambient to 1500° F., a pressure in the range of about 5 to 250 atmosphere, and a velocity in the range of about 100 feet per second to sonic velocity; (3) mixing together said first and second reactant feedstreams from (1) and (2) in said central pre-mix chamber and vaporizing about 0 to 100 volume % of said liquid carrier to produce a multiphase mixture at a temperature below its autoignition temperature and in which the ratio of the atoms of free-oxygen plus atoms of organically combined oxygen in the solid carbonaceous fuel per atom of carbon in the solid carbonaceous fuel (O/C atomic ratio) is in the range of 0.5 to 1.95; and the $H_2O$/fuel weight ratio of lbs. of $H_2O$ per lb. of solid carbonaceous fuel plus liquid hydrocarbonaceous material, if any, is in the range of about 0.1 to 3.0; (4) simultaneously and concurrently passing a second stream of said first reactant feedstream at substantially the same temperature, pressure, and velocity as specified in (1), through either the second or third annular passage of the burner and into the annular pre-mix chamber in the burner; (5) simultaneously and concurrently passing a second stream of said second reactant feedstream at substantially the same temperature, pressure and velocity as specified in (2) through either the second or third annular passage of the burner whichever is free and into said annular pre-mix chamber; (6) mixing together said first and second reactant feedstreams from (4) and (5) in said annular pre-mix chamber and vaporizing about 0 to 100 volume % of said liquid carrier to produce a multiphase mixture at a temperature below its autoignition temperature and having substantially the same O/C atomic ratio and $H_2O$/fuel weight ratio as specified in (3); (7) discharging the multiphase mixtures produced in the pre-mix chambers in (3) and (6) from the burner; and (8) mixing together and reacting by partial oxidation the multiphase mixtures from (7) in the reaction zone of the gas generator.

2. The process as described in claim 1 provided with the step of simultaneously and concurrently with (7), discharging at least one high velocity jet stream(s) of sootblowing or de-slagging gaseous media through said longitudinal passage means in the water-cooled faceplate.

3. The process of claim 2 wherein said sootblowing or de-slagging gaseous material is selected from the group consisting of steam, $CO_2$, $N_2$, a recycle portion of the product gas, and mixtures thereof.

4. The process as described in claim 1 wherein the liquid carrier for said solid carbonaceous fuel is water and said pumpable slurry has a solids content in the range of about 30 to 75 weight percent; and wherein the tips of said central and third conduits are retracted upstream from the face of the burner a distance of 0.5 to 12 times the minimum diameter of said central pre-mix chamber exit orifice at the face of the burner to provide said central and annular pre-mix chambers.

5. The process as described in claim 1 wherein the tips of said central and third conduits are retracted upstream from the downstream face of the burner a distance in the range of greater than 2 to 10 times the minimum diameter of said central pre-mix chamber exit orifice at the face of the burner.

6. The process as described in claim 1 wherein said pumpable slurry of solid carbonaceous fuel in a liquid carrier said solid carbonaceous fuel is selected from the group consisting of coal, lignite, coke from coal, char from coal, coal liquefaction residues, petroleum coke, particulate carbon soot, and solids derived from oil shale, tar sands, pitch, bits of garbage, dewatered sanitary sewage, and semisolid organic materials such as asphalt, rubber and rubber-like materials including rubber automobile tires; and said liquid carrier is selected from the group consisting of water, liquid hydrocarbonaceous materials, and mixtures thereof; and said free-oxygen containing gas is selected from the group consisting of air, oxygen-enriched air, and substantially pure oxygen.

* * * * *